United States Patent
Carfore

(10) Patent No.: US 12,520,085 B2
(45) Date of Patent: Jan. 6, 2026

(54) ACOUSTIC TRANSDUCER SYSTEM WITH FEEDBACK TRANSDUCTION

(71) Applicant: QUALCOMM Incorporated, San Diego, CA (US)

(72) Inventor: Michael Carfore, Quincy, MA (US)

(73) Assignee: QUALCOMM Incorporated, San Diego, CA (US)

(*) Notice: Subject to any disclaimer, the term of this patent is extended or adjusted under 35 U.S.C. 154(b) by 318 days.

(21) Appl. No.: 18/059,886

(22) Filed: Nov. 29, 2022

(65) Prior Publication Data

US 2023/0171549 A1   Jun. 1, 2023

Related U.S. Application Data

(60) Provisional application No. 63/284,717, filed on Dec. 1, 2021.

(51) Int. Cl.
   *H04R 17/00*      (2006.01)
   *B81B 3/00*       (2006.01)

(52) U.S. Cl.
   CPC ........... *H04R 17/00* (2013.01); *B81B 3/0051* (2013.01); *B81B 2201/0257* (2013.01); *H04R 2201/003* (2013.01)

(58) Field of Classification Search
   CPC .............. H04R 17/00; H04R 2201/003; B81B 3/0051; B81B 2201/0257
   USPC ....................................................... 310/12.03
   See application file for complete search history.

(56) References Cited

U.S. PATENT DOCUMENTS

| | | | |
|---|---|---|---|
| 2015/0137834 A1* | 5/2015 | Steiner ................... | H04R 19/04 324/686 |
| 2016/0134975 A1* | 5/2016 | Kuntzman ........... | H04R 19/005 381/113 |
| 2016/0142828 A1* | 5/2016 | Yang ...................... | H04R 17/02 381/173 |

(Continued)

OTHER PUBLICATIONS

Abdelsalam M., et al., "Supporting Circuitry for a Fully Integrated Micro Electro Mechanical (MEMS) Oscillator in 45 nm CMOS Technology", 2010 18th IEEE/IFIP International Conference on VLSI and System-on-Chip, 2010, pp. 259-263.

(Continued)

*Primary Examiner* — Carolyn R Edwards
*Assistant Examiner* — Dylan Maguire Neece
(74) *Attorney, Agent, or Firm* — QUALCOMM Incorporated; Espartaco Diaz Hidalgo

(57) ABSTRACT

Aspects of transducers with feedback transduction are described. One aspect is a transducer system comprising an operational amplifier having an inverting input, a non-inverting input, and an output. The transducer system also includes a piezoelectric microelectromechanical system (MEMS) transducer having a first node and a second node, wherein the first node is coupled to the inverting input of the operational amplifier, and wherein the piezoelectric MEMS transducer is configured to generate an electrical signal across the first node and the second node in response to a signal incident upon the piezoelectric MEMS transducer. The transducer system also includes an attenuator having an input and an output, wherein the input of the attenuator is coupled to the output of the operational amplifier, and wherein the output of the attenuator is coupled to the second node of the piezoelectric MEMS transducer.

19 Claims, 11 Drawing Sheets

(56) References Cited

U.S. PATENT DOCUMENTS

2016/0157017 A1* 6/2016 Lesso ................ G01P 15/125
                                                    381/71.7
2021/0360347 A1* 11/2021 Aschieri ............. H03F 3/183

OTHER PUBLICATIONS

Jawed S.A., et al., "A Low-Power Interface for the Readout and Motion-Control of a MEMS Capacitive Sensor", 2008 10th IEEE International Workshop on Advanced Motion Control, 2008, pp. 122-125.

Mestrom R.M.C., et al., "Phase Feedback for Nonlinear MEM Resonators in Oscillator Circuits", IEEE/ASME Transactions on Mechatronics, vol. 14, No. 4, Aug. 2009, pp. 423-433.

International Search Report and Written Opinion—PCT/US2022/080681—ISA/EPO—Mar. 28, 2023.

* cited by examiner

ACOUSTIC TRANSDUCER SYSTEM WITH FEEDBACK TRANSDUCTION

CROSS-REFERENCE TO RELATED APPLICATIONS

This application claims the benefit of U.S. Provisional Application No. 63/284,717, filed Dec. 1, 2021, titled "SYSTEM WITH FEEDBACK TRANSDUCTION," which is hereby incorporated by reference, in entirety and for all purposes.

TECHNICAL FIELD

This disclosure relates generally to acoustic transducers, and more specifically to piezoelectric microelectromechanical systems (MEMS) acoustic transducers integrated with feedback transduction.

BACKGROUND

MEMS technology has enabled the development of smaller microphones and other acoustic transducers using wafer deposition techniques. In general, MEMS microphones can take various forms including, for example, capacitive microphones and piezoelectric microphones. MEMS capacitive microphones and electric condenser microphones (ECMs) currently dominate the consumer electronics microphone market. Piezoelectric MEMS systems such as microphones, however, are a growing market and offer various advantages. For example, piezoelectric MEMS microphones may not require a backplate which eliminates squeeze film damping (an intrinsic noise source for capacitive MEMS microphones). In addition, piezoelectric MEMS microphones are reflow-compatible and can be mounted to a printed circuit board (PCB) using lead-free solder processing, which could irreparably damage other types of microphones. These advantages, and others, may be more fully realized by improved piezoelectric MEMS microphones, that for example, address high noise floors and improve microphone sensitivity.

SUMMARY

Various implementations of systems, methods, and devices within the scope of the appended claims each have several aspects, no single one of which is solely responsible for the desirable attributes described herein. Without limiting the scope of the appended claims, some prominent features are described herein. Aspects described herein include devices, wireless communication apparatuses, circuits, and modules supporting piezoelectric MEMS transducers.

One aspect is a microelectromechanical (MEMS) transducer system. One such aspect is a transducer system comprising: an operational amplifier having an inverting input, a non-inverting input, and an output; a piezoelectric microelectromechanical system (MEMS) transducer having a first node and a second node, wherein the first node is coupled to the inverting input of the operational amplifier, and wherein the piezoelectric MEMS transducer is configured to generate an electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the second node of the piezoelectric MEMS transducer.

Some such aspects operate where the attenuator is a resistor divider network. Some such aspects operate where the attenuator comprises a programmable switched resistor ladder coupled to control circuitry, the control circuitry configured to select an attenuation value for the attenuator. Some such aspects operate where the attenuator comprises a capacitor divider network; and the non-inverting input of the operational amplifier is coupled to a reference voltage node. Some such aspects operate where the attenuator has an attenuation value of −10 decibels (dB). Some such aspects operate where the attenuator has an attenuation value less than or equal to 1. Some such aspects operate where the attenuation value is greater than or equal to $1/100$.

Some such aspects further comprise an analog-to-digital converter coupled to the output of the operational amplifier. Some such aspects operate where the operational amplifier further comprises an inverting output separate from the output, and wherein the output is a non-inverting output.

Some such aspects further comprise: a second attenuator having an input and an output, wherein the input is coupled to the inverting output of the operational amplifier; and a second piezoelectric MEMS transducer having a first node and a second node, wherein the first node is coupled to the non-inverting input of the operational amplifier, wherein the second node is coupled to the output of the second attenuator, and wherein the second piezoelectric MEMS transducer is configured to generate an inverted electrical signal to provide a differential signal at the operational amplifier.

Some such aspects further comprise: a second attenuator having an input and an output, wherein the input is coupled to the inverting output of the operational amplifier; wherein the piezoelectric MEMS transducer further comprises: a first MEMS beam coupled across the first node and the second node to generate the electrical signal; a third node coupled to the non-inverting input of the operational amplifier; a fourth node coupled to the output of the second attenuator; and a second MEMS beam coupled across the third node and the fourth node, wherein the second MEMS beam is configured to generate an inverted electrical signal in response to the signal such that the electrical signal and the inverted electrical signal are input to the operational amplifier as a differential signal across the inverting input and the non-inverting input.

Some such aspects operate where the attenuator comprises a differential attenuator, the differential attenuator having a second input and a second output, wherein the second input is coupled to the inverting output of the operational amplifier; and wherein the transducer system further comprises a second piezoelectric MEMS transducer having a first node and a second node, wherein the first node is coupled to the non-inverting input of the operational amplifier, wherein the second node is coupled to the second output of the differential attenuator, and wherein the second piezoelectric MEMS transducer is configured to generate an inverted electrical signal to provide a differential signal at the operational amplifier.

Some such aspects operate where the attenuator comprises a differential attenuator having a second input and a second output, wherein the second input is coupled to the inverting output of the operational amplifier; wherein the piezoelectric MEMS transducer further comprises: a first MEMS beam coupled across the first node and the second node to generate the electrical signal; a third node coupled to the non-inverting input of the operational amplifier; a fourth node coupled to the second output of the differential attenuator; and a second MEMS beam coupled across the third node and the fourth node, wherein the second MEMS beam is configured to generate an inverted electrical signal in response to the signal such that the electrical signal and the inverted electrical signal are input to the operational amplifier as a differential signal across the inverting input and the non-inverting input.

Another aspects is a microelectromechanical system (MEMS) transducer system. The MEMS transducer system comprises an operational amplifier having an inverting input, a non-inverting input, and an output; and a piezoelectric MEMS transducer coupled between the inverting input and the output of the operational amplifier.

Some such aspects further comprise an attenuator coupled between the output of the operational amplifier and the piezoelectric MEMS transducer.

Some such aspects operate where the operational amplifier is a differential amplifier, wherein the attenuator is a differential attenuator further coupled between the non-inverting input and a second output of the operational amplifier.

Some such aspects operate where the piezoelectric MEMS transducer comprises a MEMS microphone.

Some such aspects operate where the piezoelectric MEMS transducer system has an inherent input referred noise that is independent of a gain of a closed-loop system from the output to the inverting input.

Another aspect is a method. The method comprises receiving a signal at a piezoelectric microelectromechanical system (MEMS) transducer; generating an electrical signal from an piezoelectric MEMS system with a feedback transduction loop, the piezoelectric MEMS system comprising: an operational amplifier having an inverting input, a non-inverting input, and an output; the piezoelectric MEMS transducer having a first node and a second node, wherein the first node is coupled to the inverting input of the operational amplifier, and wherein the piezoelectric MEMS transducer is configured to generate the electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the second node of the piezoelectric MEMS transducer.

Some such methods operate where the signal is an acoustic signal, and wherein the acoustic signal is received via an acoustic port of the piezoelectric MEMS transducer.

The foregoing, together with other features and embodiments, will become more apparent upon referring to the following specification, claims, and accompanying drawings.

BRIEF DESCRIPTION OF DRAWINGS

Like reference symbols in the various drawings indicate like elements.

DETAILED DESCRIPTION

Figure 1:
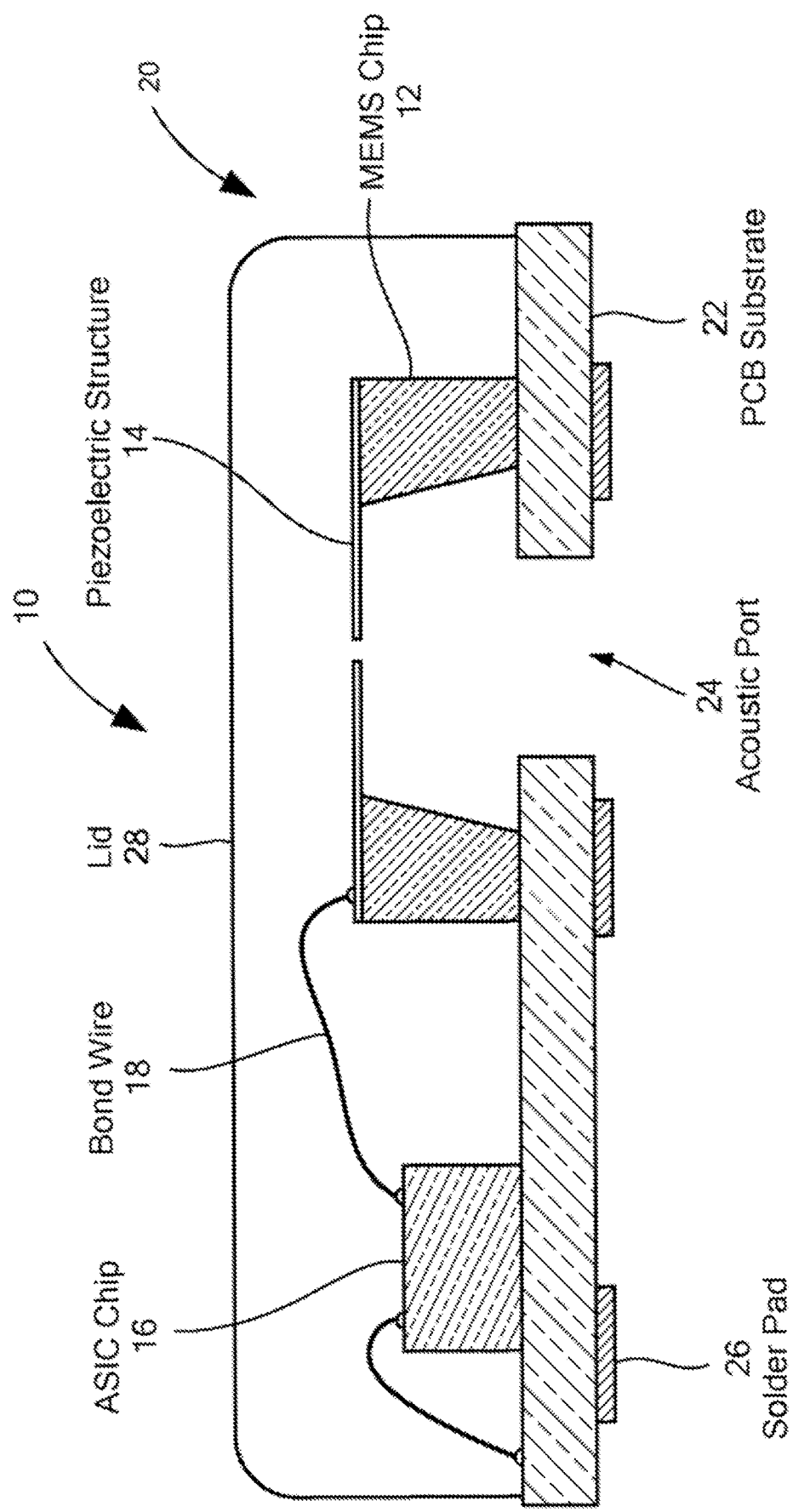
FIG. 1 illustrates an example of an acoustic transducer in accordance with aspects described herein.

The detailed description set forth below in connection with the appended drawings is intended as a description of example aspects and implementations and is not intended to represent the only implementations in which the invention may be practiced. The detailed description includes specific details for the purpose of providing a thorough understanding of the example aspects and implementations. In some instances, some devices are shown in block diagram form. Drawing elements that are common among the following figures may be identified using the same reference numerals.

Aspects described herein include piezoelectric microelectromechanical systems (MEMS) acoustic transducers. Such acoustic transducers convert acoustic energy into electrical signals. An example of a piezoelectric MEMS system using a MEMS acoustic transducer is a MEMS microphone, which converts sound pressure into an electrical voltage. MEMS acoustic transducers as described herein can be made up of cantilevered beams over an air pocket and largely enclosing the air pocket so that an outside space and the air pocket are separated by the beams of the MEMS acoustic transducer. The air pressure differences between the air in the pocket and the air on the other side of the beams from the pocket (e.g., an outside area where an audio source creates air vibrations or sound) cause electrical signals in the piezoelectric MEMS transducer as the cantilevered beams are deflected based on the changes in air pressure.

Applications of such MEMS transducers can be implemented with an amplifier as part of an analog front-end for an application using the MEMS transducer (e.g., a microphone). Problems can arise when the noise of the transducer and/or the amplifier interfere with the output signal from the transducer. Input noise to the amplifier in such systems is described as modeled noise, particularly with respect to FIGS. 4A and 5A. In illustrative embodiments, the op-amp input referred noise of a microphone system is not dependent on the closed-loop system gain. To that end, the microphone system couples a microphone in a feedback loop between an analog front end amplifier output and input. While some implementations may include a single ended design (e.g., FIGS. 4A, 4B, and 4C with one microphone), other implementations use a differential design (e.g., FIGS. 5A, 5B, and 5C) with one microphone in a feedback loop of one op-amp input (e.g., the positive input), and another microphone in another feedback loop to the other op-amp input (e.g., the negative input). Other implementations of a differential system can use differential signals from a single microphone (e.g., a single piezoelectric MEMS acoustic transducer) by using opposite polarity signals from different MEMS beams (e.g., cantilevers) in a single microphone.

Illustrative aspects include an analog front-end architecture with a piezoelectric MEMS transducer in the amplifier feedback loop. Aspects can improve device operation with improved noise and power performance (e.g., reduced noise and lower power for given operating conditions). Such device improvements can particularly be provided at low signal gain settings (e.g., gain settings selected by an output attenuator with attenuation values for the feedback loop approximately between 1 and 1/10 (e.g., between 0 decibels (dB) and 20 dB of attenuation). Other aspects can operate at other gain settings with attenuation values lower than 1/10 (e.g., 1/100, between 20 dB and 40 dB of attenuation, or at other settings limited by the open loop gain of the amplifier and/or bandwidth considerations). Details of illustrative embodiments are discussed below.

FIG. 1 illustrates an example of an acoustic transducer in accordance with aspects described herein. FIG. 1 schematically shows a cross-sectional view of an acoustic sensor implemented as MEMS transducer 10 (e.g., a MEMS microphone). As shown, the MEMS transducer 10 of FIG. 1 includes a MEMS chip 12 which can include a die having piezoelectric structures 14, (e.g. cantilevers or diaphragms, to convert sound pressure into electrical signals), and an application-specific integrated circuit chip 16 to buffer and amplify the electrical signal generated by the MEMS chip 12. The MEMS chip 12 and ASIC chip and 16 are electrically connected by wire bonding 18, and mounted within the interior chamber of a package (although other packaging and connection techniques are possible). The package has a lid 28 and a substrate 22 (e.g., a printed circuit board). The PCB Substrate 22 and the MEMS substrate of the MEMS chip 12 form an acoustic port 24 for enabling sound pressure to access the piezoelectric structure(s) 14 of the MEMS chip 12 Multiple solder pads 26 are disposed on a bottom surface of the PCB substrate 22 for solder connections of the MEMS transducer 10 as an element of additional devices. The MEMS transducer can, for example, be used as a microphone or other sensor in cell phones, laptop computers, portable microphones, smart home accessories, or any other such devices. A lid 28 can be used to form the housing of the microphone, to provide an air pocket which provides one side of the air pressure differentiation that causes deflection and signal generation in the MEMS chip 12, and to mitigate electromagnetic interference (EMI).

As noted, the MEMS chip 12 may be formed from one or more piezoelectric cantilevers or diaphragms (e.g., discussed below and illustrated in FIG. 2). A cantilever based piezoelectric structure 14 provides a benefit of reduced die stress after the die is released during fabrication. On the other hand, a diaphragm structure of such a microphone chip 12 can require more stress control in the fabrication process as minimal residual stress within the diaphragm can result in significant sensitivity degradation. Multiple cantilevers can be arranged to form a piezoelectric sensing structure, (e.g., an a square shape, a hexagon shape, an octagon shape, or some other shape).

FIG. 1 illustrates a structure with the MEMS chip 12 having an acoustic port 24 formed in the MEMS substrate. In other implementations, the MEMS substrate can be closed, with a pocket similar to the pocket formed by a cavity below the piezoelectric structures 14 and the acoustic port 24 on the opposite side of the piezoelectric structure(s) 14 from the substrate 22. In other implementations, other such configurations of the acoustic port 24 can be used so long as a path for acoustic pressure to reach the piezoelectric structures 14 is present.

Additionally, rather than implement the system with two separate chips, some embodiments may implement both the MEMS chip 12 and ASIC 16 as part of the same die. Accordingly, discussion of separate chips is for illustrative purposes. In addition, in other embodiments the ASIC 16 may be implemented on a die in a separate package with one or more interconnects electrically coupling the MEMS chip 12 to the ASIC 16. Similarly, the amplifier discussed above and used for feedback transduction in a feedback transduction loop can, in some aspects, be implemented on an ASIC 16 separate from the MEMS chip 12. In other aspects, the amplifier can be implemented as part of a combined IC with both MEMS and ASIC components of the MEMS chip 12 and the ASIC 16.

Figure 2:
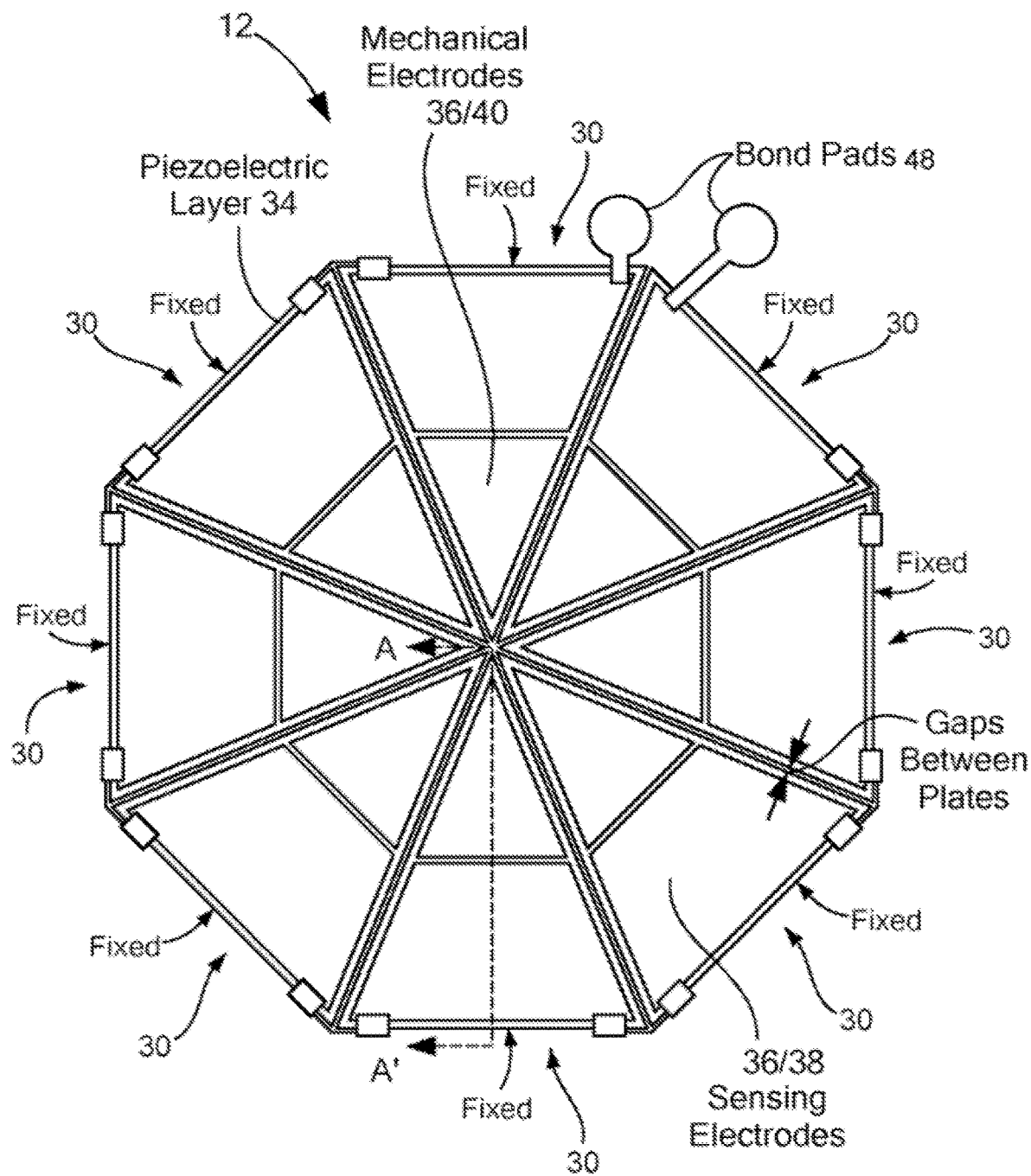
FIG. 2 illustrates a plan view of a MEMS microphone that may be used in accordance with aspects described herein.

FIG. 2 illustrates a plan view of a MEMS microphone that may be used in accordance with aspects described herein. FIG. 2 schematically shows a plan view of a piezoelectric MEMS acoustic transducer of a MEMS chip 12 using eight MEMS sense members (e.g., also known as "sense arms", "beams", "cantilevers", or "cantilevered beams") formed as piezoelectric triangular cantilevers 30. These members together form an octagonal MEMS acoustic sensor.

Each cantilever 30 has a piezoelectric structure formed in a piezoelectric layer 34, with the structure of each of the eight cantilevers 30 having an associated fixed end and an associated central end. The central end of each cantilever 30 in FIG. 2 meet near a center, with edges of each cantilever 30 separated from adjacent cantilever by baps between the cantilevers 30, as illustrated. During operation, the fixed ends remain stationary, and pressure from acoustic signals (e.g., from the acoustic port 24) incident on the cantilevers 30 causes a pressure differential, which causes the cantilevers 30 to deflect in and out (e.g., via a slight rotation around the fixed end). The deflection causes an electrical signal from the sensing electrodes 36/38 which creates the electrical signal that can be amplified by an analog front end and passed to processing circuitry as an audio signal. The mechanical electrodes 36/40 provide mechanical structure in the central end of each cantilever 30 of the.

In some implementations, the immobile portion of the fixed end is approximately 10 micrometers (um) of a 400 um long beam, with the remaining portion of the fixed end bending (e.g., deflecting) along with the free end based on acoustic pressures applied across the cantilevers 30. The eight cantilevers 30 each have a similar triangle shape, with the triangle bases fixed to a substrate (e.g., a substrate of the MEMS chip 12, not shown in FIG. 2) at the extreme end of the fixed end of each cantilever 30. Each cantilever 30 is positioned with sides adjacent to sides of another of the cantilevered beams separated by the gap between the cantilevers. The position of the eight cantilevers 30 with the gaps creates a symmetrical polygon shape bounded by the fixed bases around the outside of the symmetrical polygon (e.g., an octagon, with one exterior side for each of the cantilever 30). In other aspects, other shapes can be used. In other implementations, MEMS acoustic transducers can include cantilevered beams with different beam shapes for the same transducer, so long as the fixed exterior edges attached to the substrate form an enclosed transducer that separates air on one side (e.g., a pocket side) from air on another side (e.g., an acoustic port side similar to the acoustic port 24) using the cantilevered beams (e.g., the cantilevers 30) and gaps between the beams. The separation allows the pressure difference between the sides of the MEMS transducer to apply force to the beams and generate a signal that can be communicated to an analog front end (e.g., an amplifier with feedback transduction as described in FIGS. 4A, 4B, 5A, and 5B, etc.) and then to additional processing circuitry via the bond pads 48.

As illustrated in FIG. 2, the cantilevers 30 have an associated length, determined by the line segment from the tip of the central end that is perpendicular to the fixed extreme end of the fixed end. The line segment extends from the fixed end at the substrate to the tip of the central end. As described above, when sound vibrations are present at a surface of the deflection beams, the cantilevered beams will move due to the pressure (e.g., z direction movement in and out of the x-y plane illustrated in FIG. 2. The movement in and out of this plane is referred to herein as vertical deflection. The deflection at the fixed end will be less than the deflection at the central end, with the amount of deflection increasing along the distance of the line segment away from the substrate toward the tip of the central end. The electrodes that generate the electrical signals at the bond pads 48 in response to the acoustic vibrations on the cantilevers 30 can add rigidity to the cantilever 30, and so in some implementations, placement of the sensing electrodes 36/38 can be limited to a space approximately two-thirds of the line segment distance from the fixed attachment to the substrate at the fixed end towards the tip of the central end (e.g., limited to a fixed end). In some implementations, an electrode layer can cover a surface or x-y plane cross section of the entire illustrated fixed end of each of the cantilevered beams. In other implementations, smaller electrode shapes can be used in a portion of the fixed end of each of the cantilevers 30. In some aspects, the central end of each of the cantilevered beams does not include electrode layers. In some aspects, the electrode layers do not extend to the tip of the central end (e.g., the free movement end) of each cantilever 30 to avoid sensing free end movement in the deflection end (e.g., where the signal which is proportional to the stress in the cantilever) is lower.

Figure 3:
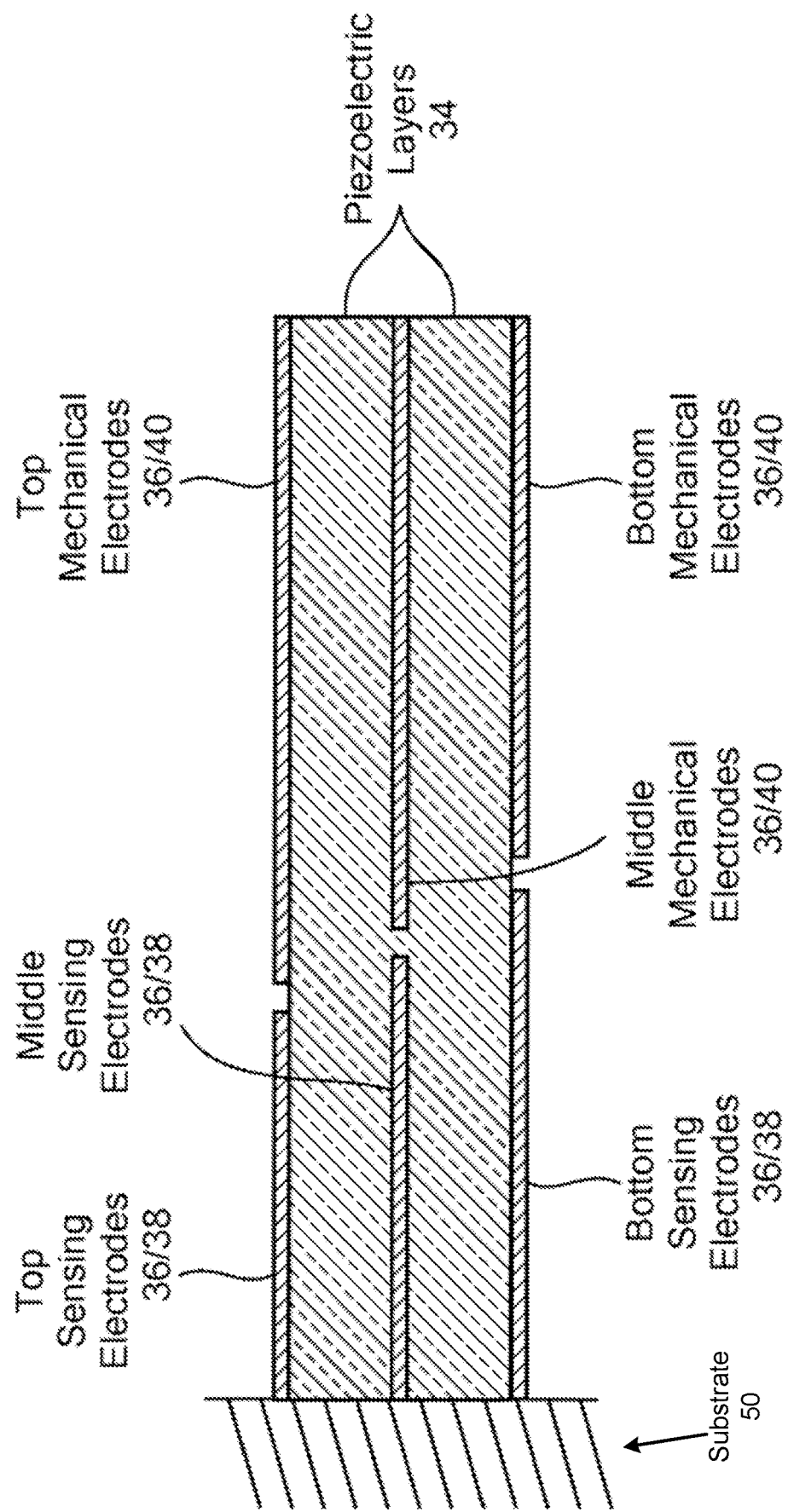
FIG. 3 illustrates a cross-sectional view of one portion of the MEMS microphone of FIG. 2 in accordance with aspects described herein.

FIG. 3 illustrates a cross-sectional view of one portion of the MEMS microphone of FIG. 2 accordance with aspects described herein. FIG. 3 shows an example cross-sectional view of one of those cantilevers 30. Other aspects of a piezoelectric MEMS acoustic transducer may use more or fewer cantilevers 30. Accordingly, as with other features, discussion of eight cantilevers 30 is for illustrative purposes only. These triangular cantilevers 30 are fixed to a substrate 50 (e.g., a silicon substrate) at their respective bases and are configured to freely move in response to incoming/incident sound pressure (i.e., an acoustic wave). The intersection of the substrate 50 and the piezoelectric layers (e.g., as well as the electrodes at the substrate 50) are the fixed end of the cantilever(s) 30. Triangular cantilevers 30 can provide a benefit over rectangular cantilevers as the triangular cantilevers can be more simply configured to form a gap controlling geometry separating an acoustic port (e.g., the acoustic port 24) on one side of the cantilevers of the piezoelectric MEMS acoustic transducer from an air pocket on the other side of the cantilevers. Specifically, when the cantilevers 30 bend up or down due to either sound pressure or residual stress, the gaps between adjacent cantilevers 30 typically remain relatively small and uniform in the example symmetrical shapes with fixed ends using the triangular cantilevers 30.

MEMS acoustic transducers are used herein to describe illustrative aspects. However, it will be apparent that aspects described herein can be used for applications with MEMS transducers for signals other than acoustic signals.

The cantilever 30 can be fabricated by one or multiple layers of piezoelectric material sandwiched by top and bottom metal electrodes 36. FIG. 3 schematically shows an example of this structure. The piezoelectric layers 34 can be made by piezoelectric materials used in MEMS devices, such as one or more of aluminum nitride (AlN), aluminum scandium nitride (AlScN), zinc oxide (ZnO), and lead zirconate titanate (PZT). The electrodes 36 can be made by metal materials used in MEMS devices, such as one or more of molybdenum (Mo), platinum (Pi), nickel (Ni) and aluminum (Al). Alternatively, the electrodes 36 can be formed from a non-metal, such as doped polysilicon. These electrodes 36 can cover only a portion of the cantilever 30, e.g., from the base to about one third of the cantilever 30, as these areas generate electrical energy more efficiently within the piezoelectric layer 34 than the areas near the central end (e.g., the free movement end) of each cantilever 30. Specifically, high stress concentration in these areas near the base induced by the incoming sound pressure is converted into electrical signal by direct piezoelectric effect.

The electrodes 36 are generally identified by reference number 36. However, the electrodes used to sense signal are referred to as "sensing electrodes" and are identified by reference number 38. These electrodes are electrically connected in series to achieve the desired capacitance and sensitivity values. In addition to the sensing electrodes 38, the rest of the cantilever 30 also may be covered by metal to maintain certain mechanical strength of the structure. However, these "mechanical electrodes 40" do not contribute to the electrical signal of the microphone output. As discussed above, some aspects can include cantilevers 30 without mechanical electrodes 40.

As described above, as a cantilever 30 bends or flexes around the fixed end, the sensing electrodes 36/38 generate an electrical signal. The electrical signal from an upward flex (e.g., relative to the illustrated positioning in FIG. 3, will be inverted compared with the signal of a downward flex. In some implementations, the signal from each cantilever 30 of a piezoelectric MEMS acoustic transducer can be connected to the same signal path so that the electrical signals from each cantilever 30 are combined (e.g., a shared bond pads 48). In other aspects, each cantilever 30 may have a separate signal path, allowing the signal from each cantilever 30 to be processed separately. In some aspects, groups of cantilevers 30 can be connected in different combinations.

In one aspect, adjacent cantilevers 30 can be connected to separate electrical paths, such that every other cantilever 30 has a shared path. The electrical connections in such a configuration can be flipped to create a differential signal. Such an aspect can operate such that when an acoustic signal incident on a piezoelectric MEMS acoustic transducer causes all the cantilevers 30 to flex upward, half of the cantilevers 30 create a positive signal, and half the cantilevers 30 create a negative signal. The two separate signals can then be connected to opposite inverting and non-inverting ends of an amplifier of an analog front end. Similarly, when the same acoustic vibration causes the cantilevers 30 to flex downward, the signals of the two groups will flip polarity, providing for a differential electrical signal from the piezoelectric MEMS acoustic transducer.

Alternatively, rather than alternating cantilevers 30 within a single piezoelectric MEMS transducer to create a differential signal, identical MEMS transducers can be placed across a shared acoustic port (e.g., the acoustic port 24), with the connections to the amplifier of an analog front-end reversed and coupled to different inverting and non-inverting inputs of a differential amplifier of the analog front-end to create the differential signal using multiple piezoelectric MEMS transducers. Additional details related to the configuration of a MEMS transducer system for differential signals is described below with respect to FIGS. 5A and 5B.

Figure 4A:
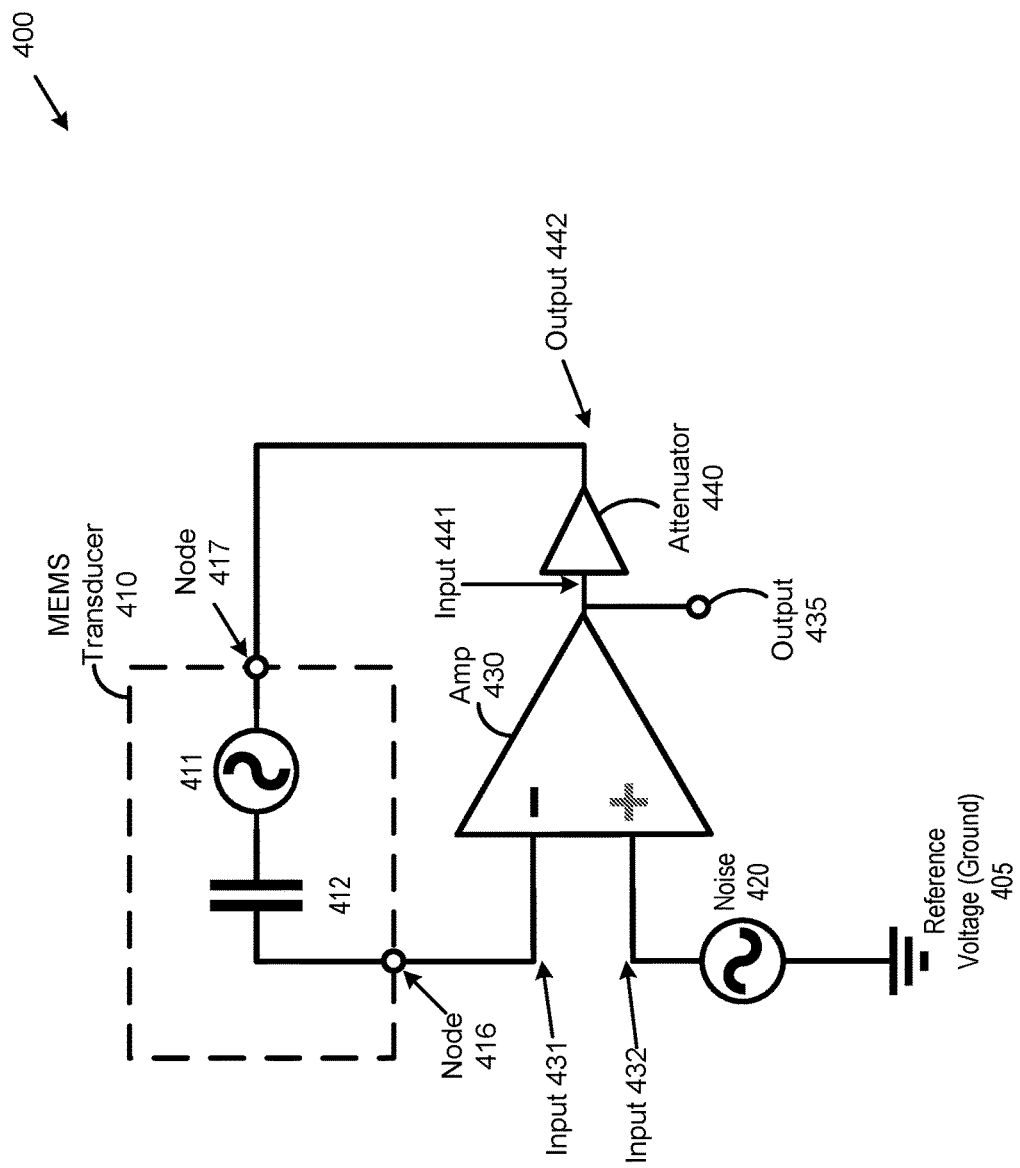
FIG. 4A illustrates aspects of a MEMS transducer system in accordance with aspects described herein.

FIG. 4A illustrates aspects of a MEMS transducer system 400 in accordance with aspects described herein. FIG. 4A schematically shows an example implementation of the microphone transducer system 10 of FIGS. 1-3 configured in accordance with illustrative embodiments. Other implementations of the microphone transducer system 10 will be apparent in accordance with aspects described herein. As shown, the microphone system 10 has an operational amplifier 430 with an inverting input 431 (e.g., a negative input), a non-inverting input 432 (e.g., a positive input), and an output 435 (e.g., Vo). Operational amplifiers, such as the operational amplifier 430 of FIGS. 4A-C (and the differential amplifier 530 of FIGS. 5A and 5B) have a high open-loop gain, a zero or negligible output impedance, and a high input impedance. The operational amplifier 430 produces an output voltage at the output 435 (also designated as "Vo") that is a function of the difference between the voltages at the two inputs 431, 432. Alternative embodiments may use circuitry mimicking operational amplifier characteristics (e.g., high open-loop gain, a zero or negligible output impedance, and a high input impedance, etc.), however, without using an operational amplifier, or using similar circuitry integrated into a broader device (e.g., the ASIC chip 16 of FIG. 1).

The operational amplifier 430 of FIG. 4A (and e.g., the similar differential operational amplifier 530 of FIG. 5A, discussed below) has a voltage noise schematically represented as noise 420 (e.g., also referred to as Vn, and illustrated as noise 520 in FIG. 5A) coupled between a reference voltage node 405 (e.g., ground), and the non-inverting input 432 of the operational amplifier 430. Note that this designation does not mean to imply that such a source is expressly added to the circuit. Instead, this symbol is used to expressly show the voltage noise 420 (e.g., Vn), and using typical convention, represented on the non-inverting input 432 of the operational amplifier 430. The transducer system 400 also optionally has an attenuator 440. In some implementations, the attenuator 440 can simply be replaced with a path or signal line, essentially having the attenuator 440 provide no attenuation, or an attenuation value of 1. In other aspects, the attenuator 440 can operate as a secondary amplifier coupled with its output Vo to increase or decrease the output voltage Vo of the operational amplifier 430 in the transduction feedback loop (e.g., the loop from output 435 to input 431 including the MEMS transducer 410 with connecting nodes 417 and 416 in the transducer feedback path from the output 435 to the inverting input 431 (e.g., including the attenuator 440 in FIG. 4A). In some aspects, the secondary amplifier is an implementation of the attenuator 440 with a gain factor of less than or equal to 1 (e.g., −10 decibels (dB), 0 dB, −20 dB, or ranges from 0.01 to 1 attenuation or from 0 dB to −20 dB). Those skilled in the art may implement this secondary amplifier or the attenuator 440 in any of a variety of manners. In one aspect, the attenuator 440 is a resistor divider network.

In some aspects, the resistor divider network of the attenuator 440 is implemented using a programmable switched resistor ladder with discrete attenuation value control steps. The switched resistor ladder is coupled to control circuitry that is configured to select a resistor value with a switch setting selected by the control circuitry. During manufacturing, piezoelectric MEMS acoustic devices such as those described in FIGS. 1-3 can include manufacturing variations on a part-to-part basis that impact device operation characteristics. Control circuitry selecting an attenuation value for the attenuator 440 (e.g., via a switched resistor ladder) can select an attenuation trim to set device sensitivity to a desired value based on part sensitivity for a particular device based on part sensitivity associated with manufacturing variations. In other aspects, a capacitor divider network can similarly be used in place of or in conjunction with a resistor divider, with selectable discrete values set by control circuitry to standardize performance in view of MEMS device manufacturing variations.

In accordance with illustrative embodiments, the MEMS transducer 410 (e.g., a MEMS microphone) is electrically coupled between the inverting input 431 of the operational amplifier 430 and the output 435 of the operational amplifier 430. In the illustrated implementation, the attenuator 440 has input 441 and output 442, with the attenuator 440 additionally positioned in the path between the operational amplifier 430 and the MEMS transducer 410. For example, in this case, the MEMS transducer 410 is coupled between the inverting input 431 (e.g., the negative op-amp input) and the attenuator 440 output 442. In this schematic drawing, the internal operation of the MEMS transducer 410 is modeled as a MEMS capacitance 412 and a voltage source 411. The model of the MEMS capacitance 412 and the voltage source 411 does not represent the physical construction of the MEMS transducer 410, but a model of the example piezoelectric MEMS acoustic transducer devices illustrated above (e.g., in FIGS. 1-3). In FIG. 4A, the voltage source 411 represents an input signal (e.g., a voice or other acoustic signal impacting the diaphragm of the microphone), while the MEMS capacitance 412 (e.g., of a model capacitor Cm) represents the capacitance of the microphone die.

Accordingly, using this configuration, the following functions can represent the operation of the MEMS transducer system 400. As used below, Vo is the voltage at output 435 which is the node at the output of the operational amplifier 430 and the input 441 to the attenuator 440. Vi is the voltage generated across the MEMS transducer between the node 417 and the node 416, as modeled by the MEMS capacitance and the voltage source 411. The value "n" is the gain of the attenuator as implemented in the feedback transduction loop between the output 435 and the input 431. The operation of the MEMS transducer system 400 can then be represented by the equations below, with:

The signal transfer function:

$$Vo/Vi = 1/n, \quad (1)$$

The noise transfer function:

$$Vo/Vn = 1/n, \text{ and} \quad (2)$$

The input referred noise (e.g., noise 420 amplification received at the input 431 from the transduction feedback loop):

$$Vi/Vn = 1. \quad (3)$$

As shown by the equations 1-3 above, the input referred noise of equation 3 is not a function of the gain. Accordingly, the noise 420 can be increased (e.g., "gained up") less than for a charge style architecture. Such a piezoelectric MEMS acoustic transducer system can be considered to have an inherent input referred noise that is independent of a gain of a closed-loop system from the output to the inverting input. Such noise performance between the inputs of the operational amplifier 430 and the output 435 of the operational amplifier using the feedback path with transduction between the output 435 and the inverting input 431 improves the operation of MEMS transducer systems with lower noise at an output signal for a comparable power, or the ability to have a lower output signal for a given noise threshold.

By comparison, in a system where the MEMS transducer is coupled between a reference voltage node (e.g., ground) and an amplifier input, instead of in the feedback transduction configuration, the associated descriptive equations for noise transfer and input referred noise will depend on the system gain. For example:

The signal transfer function for a voltage amplifier without feedback transduction:

$$Vo/Vi = \text{gain}, \qquad (4)$$

The noise transfer function for a voltage amplifier without feedback transduction:

$$Vo/Vn = 1 + \text{gain, and} \qquad (5)$$

The input referred noise for a voltage amplifier without feedback transduction:

$$Vi/Vn = 1 + 1/\text{gain}. \qquad (6)$$

Figure 4B:
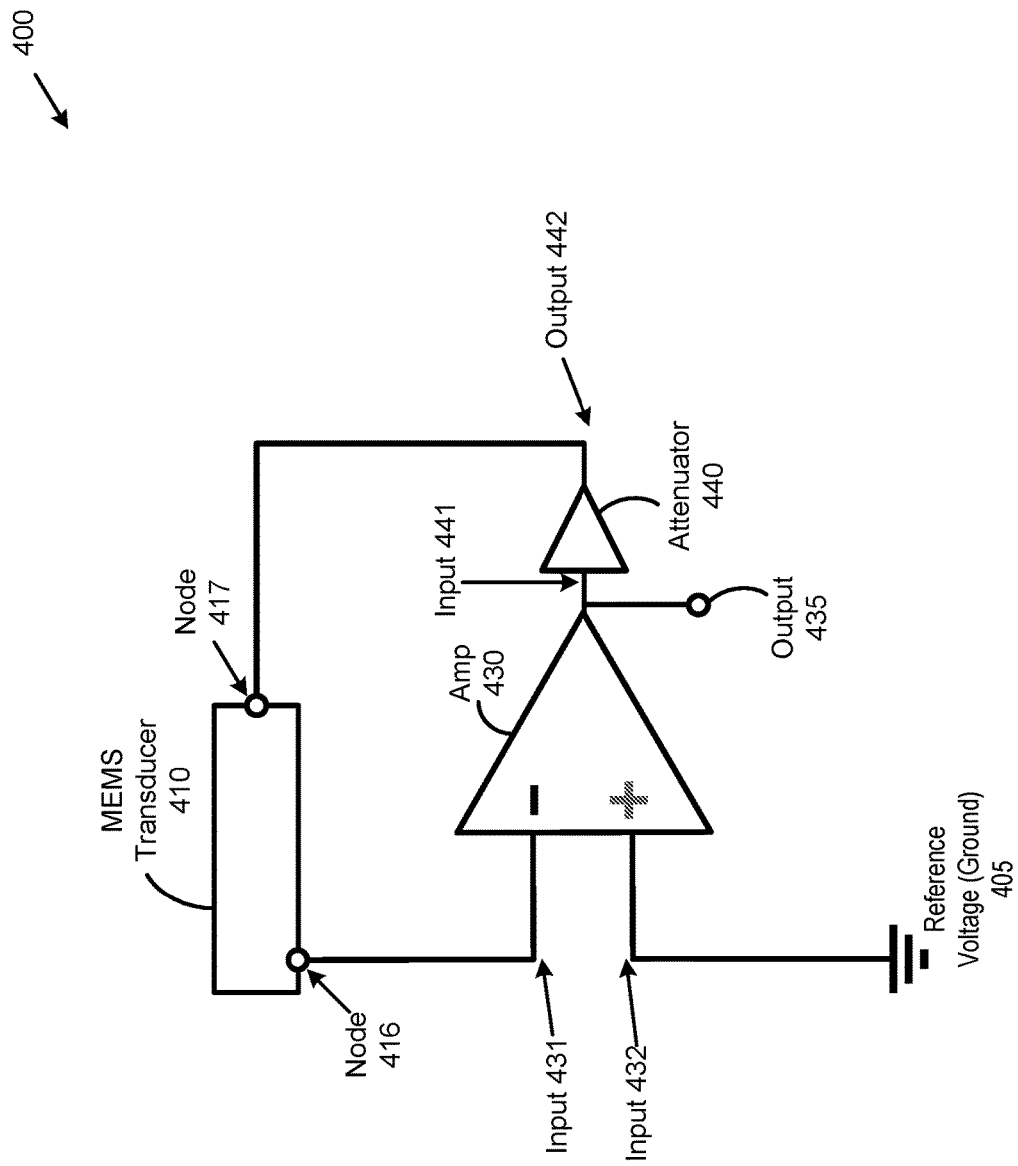
FIG. 4B illustrates aspects of a MEMS transducer system in accordance with aspects described herein.

Comparison of equation 6 with equation 3 above illustrates that the input referred noise improves for the feedback transduction configuration of FIG. 4A when compared with a voltage amplifier in a feedback configuration with the voltage input applied at the non-inverting input instead of in a feedback transduction loop. FIG. 4B illustrates aspects of the MEMS transducer system 400 in accordance with aspects described herein. FIG. 4B illustrates the MEMS transducer system 400 of FIG. 4A without the modeled noise 420 or the internal model of the MEMS transducer 410 (e.g., the MEMS capacitance 412 and the voltage source 411) of FIG. 4A.

The transducer system 400 includes the operational amplifier 430 having the inverting input 431 (e.g., the negative input), the non-inverting input 432 (e.g., the positive input), and the output 435. In digital applications (e.g., a digital microphone), the output 435 can additionally be coupled to an analog-to-digital converter (ADC) that outputs a digitized version of the electrical signal from the MEMS transducer 410 to processing circuitry of a system or device (e.g., the system 700). In analog applications, the output 435 can be coupled to additional analog filtering or amplification circuitry.

The transducer system 400 additionally includes the MEMS transducer 410 (e.g., a piezoelectric microelectromechanical system (MEMS) acoustic transducer) having the first node 416 and the second node 417. The first node and the second node can, in some aspects, be bond pads (e.g., the bond pads 48) or any other path node, connection point, or element of the MEMS transducer 410 that provides the output electrical signal generated by the MEMS transducer 410 from an input acoustic signal (e.g., sound waves) incident upon the cantilevers (e.g., the cantilevers 30) of the MEMS transducer 410. In the transducer system 400, the first node 416 is coupled to the inverting input 431 of the operational amplifier 430, and the MEMS transducer 410 is configured to generate the electrical signal across the first node 416 and the second node 417 in response to an acoustic signal incident upon the piezoelectric MEMS acoustic transducer 410 (e.g., received via an acoustic port such as the acoustic port 24).

The transducer system 400 additionally includes the attenuator 440 having the input 441 and the output 442. The input 441 of the attenuator 440 is coupled to the output 435 of the operational amplifier 430, and the output 442 of the attenuator is coupled to the second node 417 of the MEMS transducer 410. In some aspects, the transducer system 400 operates where the attenuator has an attenuation value of approximately −10 decibels (dB). In some aspects, the attenuator is programmable as part of a controllable attenuator to provide attenuation or secondary amplification with attenuation values less than or equal to 1, and attenuation values greater than or equal to 1/100 (e.g., 0.01).

Figure 4C:
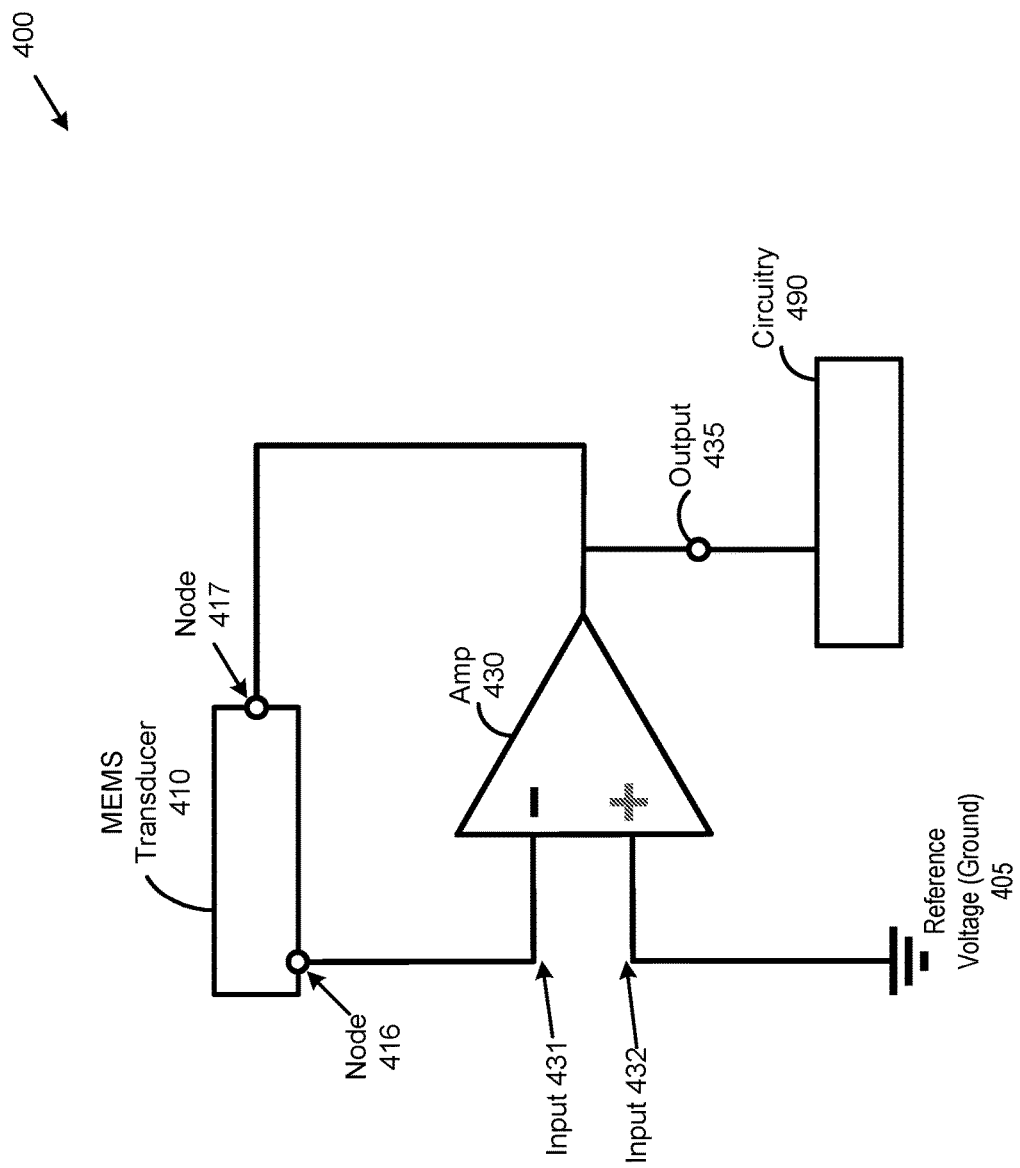
FIG. 4C illustrates aspects of a MEMS transducer system in accordance with aspects described herein.

FIG. 4C illustrates aspects of the MEMS transducer system 400 in an implementation without the attenuator 440. As described above, such an implementation can be considered an implementation with the attenuator 440 set to an attenuation value of 1. The illustrated MEMS transducer system 400 of FIG. 4C includes the operational amplifier 430 having the inverting input 431, the non-inverting input 432, and the output 435, along with the piezoelectric MEMS acoustic transducer 410 coupled between the inverting input 431 and the output 435 of the operational amplifier 430. Additionally, FIG. 4C includes circuitry 490, which can accept the output signal at the output 435 as described above (e.g., and can be included in any implementation using any aspect described herein). In some aspects, the circuitry 490 can include an analog-to-digital converter (ADC) that outputs a digitized version of the electrical signal from the MEMS transducer 410 to processing circuitry of a system or device (e.g., the system 700). In analog applications, the circuitry 490 can include additional analog filtering or amplification circuitry.

Figure 5A:
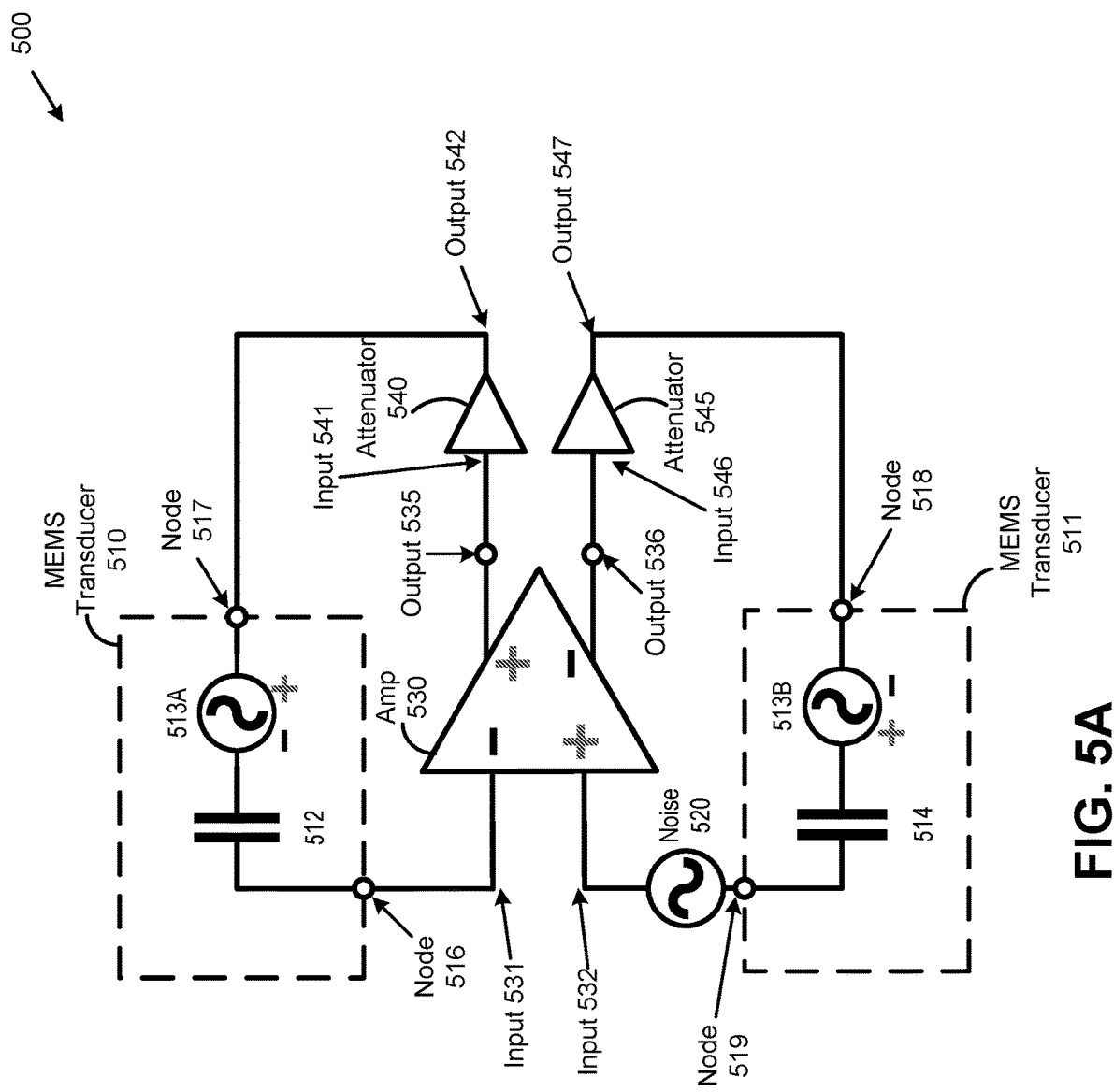
FIG. 5A illustrates aspects of a MEMS transducer system in accordance with aspects described herein.

FIG. 5A illustrates aspects of a MEMS transducer system 500 in accordance with aspects described herein. FIG. 5A schematically shows a differential amplifier embodiment. Unlike the embodiment of FIG. 4A, this embodiment has a differential output across outputs 535 and 536 of the differential operational amplifier 530 (e.g., represented as Vo+ on a positive op-amp output and as Vo− on a negative op-amp output). The embodiment of FIG. 5A may be considered to have two feedback channels: a first feedback channel between the inverting output 536 (e.g., the negative op-amp output Vo−) and the non-inverting input 532 (e.g., the positive op-amp input) of the differential amplifier 530; and a second feedback channel between the non-inverting output 535 (e.g., the positive op-amp output Vo+) and the inverting input 531 (e.g., the negative op-amp input) of the differential amplifier 530.

In a manner similar to the embodiment of FIG. 4A, each feedback channel has a MEMS transducer (e.g., a microphone) and an attenuator. As illustrated, the first feedback loop includes the MEMS transducer 510 and the attenuator 540. The second feedback loop includes the MEMS transducer 511 and the attenuator 545. Additionally, similar to the aspect of FIG. 4A, FIG. 5A includes modeled noise 520 that is an artifact of device operation and not a device component, along with modeled operation of MEMS transducers 510, 511, shown as MEMS capacitance 512 and voltage source 513A for the MEMS transducer 510 and as MEMS capacitance 514 and voltage source 513B for the MEMS transducer 511. Illustratively, both the first and second feedback channels have substantially identical components and component values, although some embodiments may configure the first and second branches to have different components and/or different component values. For example, this microphone system 10 may use two matched, single-ended MEMS microphones of opposite polarity (e.g., the MEMS transducer 510 having a first polarity and the MEMS transducer 511 having a second polarity which is opposite, switched, or reversed from the first polarity. The polarity of each MEMS transducer is indicated in FIG. 5A by the corresponding illustrated voltage source model. The voltage source 513A has the first polarity with a negative node associated with the node 516, and a positive node associated with the node 517. The MEMS transducer 511 has the modeled voltage source 513B with the opposite polarity, where the negative node associated with the node 518, and a positive node associated with the node 519. The use of opposite polarity connections generates a pseudo-differential signal at the inputs 531 and 532 of the differential amplifier 530. The signal and noise transfer functions preferably are the same as those of the embodiment of FIGS. 4A-C and have the same benefits.

For example, as described above, a single MEMS transducer can be used for MEMS transducers 510 and 511. In such an aspect, adjacent cantilevers or a group of cantilevers from a single piezoelectric MEMS acoustic transducer (e.g., cantilevers 30) can be connected to separate electrical paths. The electrical connections in such a configuration can be flipped (e.g., configured with opposite polarities) to create a differential signal. Such an aspect can operate such that when an acoustic signal incident on a piezoelectric MEMS acoustic transducer causes all the cantilevers to flex upward, a subset of the cantilevers create a positive signal, and the remaining cantilevers create a negative signal. The two separate signals can then be connected in the two feedback paths illustrated in FIG. 5A, one as MEMS transducer 510, and one as MEMS transducer 511, with the connections of one set of cantilevers including a node 517 and a node 516 for connections to the inverting input 531 and the output 535 via the attenuator 540, and the connections of the remaining cantilevers including a connection to a node 518 and a node 519 for connections in the feedback path including the inverting output 536 and the non-inverting input 532 via the attenuator 545. Similarly, when the same acoustic vibration causes the cantilevers to flex downward, the signals of the two groups will flip polarity and remain opposite to each other, providing for a differential electrical signal from the piezoelectric MEMS acoustic transducer.

Alternatively, rather than alternating cantilevers within a single piezoelectric MEMS transducer to create a differential signal, separate MEMS transducers can be placed across a shared acoustic port (e.g., the acoustic port 24), with one (or more) MEMS transducer(s) connected in the first feedback path as the MEMS transducer 510 and the other one or more MEMS transducer(s) connected with the opposite polarity in the second feedback path. The connections to the differential amplifier 530 are reversed between the different paths to provide the different polarity resulting in a differential signal using multiple piezoelectric MEMS transducers.

In either case, while the electrical signal from the MEMS transducer 510 and the MEMS transducer is different due to the different positioning of the cantilevers used to produce the signals in addition to the signals being of opposite polarity, the signals can be generated to be sufficiently matching with opposite polarity to provide an effective differential signal matching the incident acoustic signal from the acoustic port (e.g., the acoustic port 24) given an appropriate and similar positioning and placement within the acoustic path of the acoustic port.

Accordingly, by configuring the MEMS transducer 510 and the MEMS transducer 511 (e.g., either as a single device or multiple devices) effectively prevents noise gain from having a non-negligible impact on the input referred noise as illustrated by equations 1-3 above, which apply equally to the differential configuration of FIG. 5A as to the single ended configuration of FIG. 4A.

The voltage noise 520 (e.g., Vn) of the differential amplifier 530 thus can be larger for the same total system noise performance, enabling use of a lower power differential amplifier 530. Compared to state of the art microphone systems, the illustrated aspects improve device operation with added noise efficiency and/or added power efficiency. Such benefits can particularly be provided for microphone system designs operating with low signal gain.

Figure 5B:
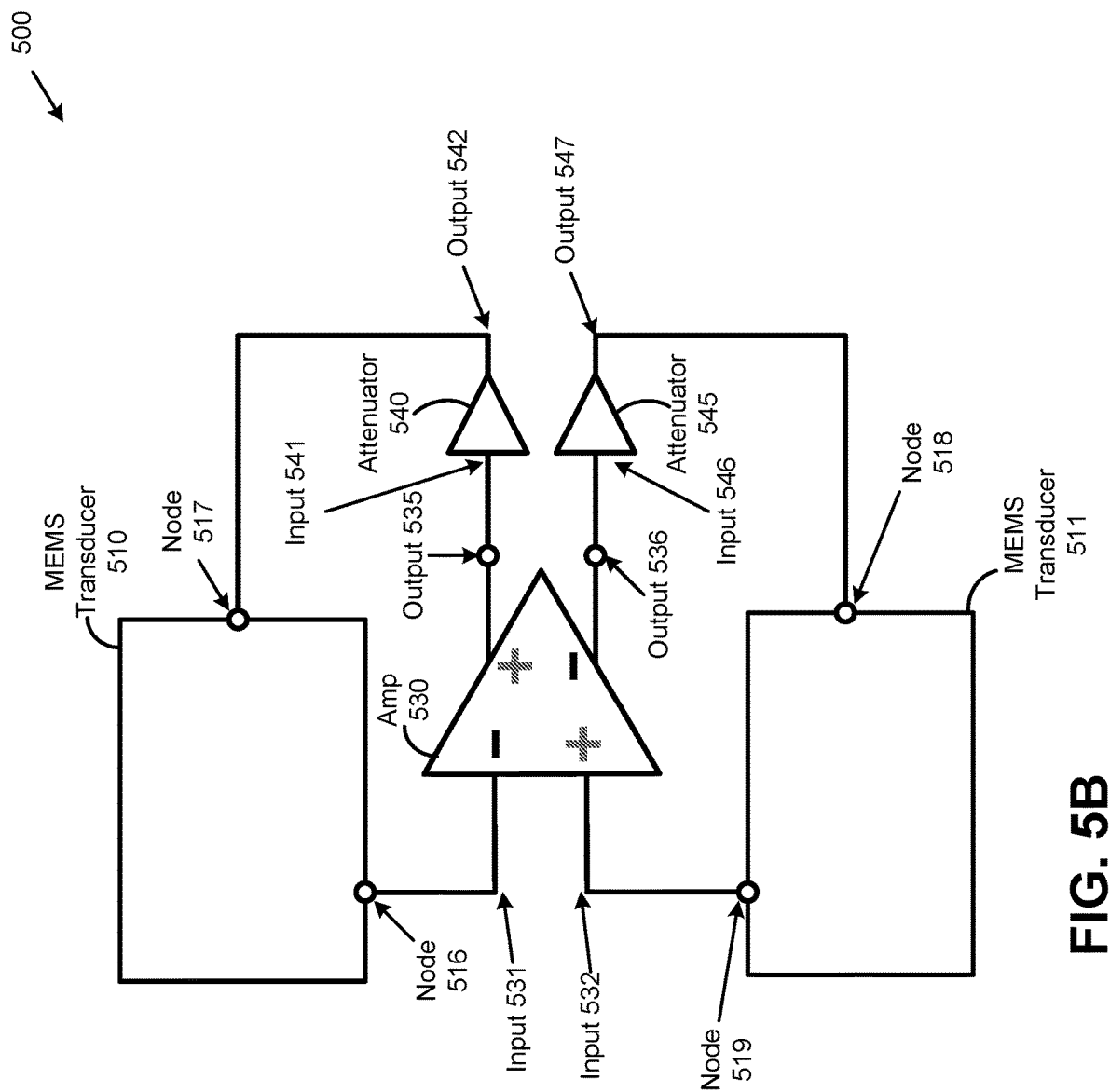
FIG. 5B illustrates aspects of a MEMS transducer system in accordance with aspects described herein.

FIG. 5B illustrates aspects of a MEMS transducer system 500 in accordance with aspects described herein. Just as with FIGS. 4A and 4B, FIG. 5B shows the MEMS transducer system 500 without the modeled noise 520 and the models of MEMS transducers 510 and 511. As illustrated by FIG. 5B, the first feedback path of FIG. 5B is the same as the feedback path of FIG. 4A, with the output connection from the amplifier in FIG. 5B coupled to the non-inverting output 535 rather than the single ended output 435 of FIG. 4B.

The transducer system 500 includes the differential amplifier 530 having the inverting input 531 (e.g., the negative input), the non-inverting input 532 (e.g., the positive input, and the output 535 configured as a non-inverting output 535. The output signal from the differential amplifier 530 is the signal across the outputs 535 and 536. Just as with the single-ended implementations, in digital applications (e.g., a digital microphone, the differential output across outputs 535 and 536 can additionally be coupled to an analog-to-digital converter (ADC) that outputs a digitized version of the electrical signal from the MEMS transducers 510 and 511 to processing circuitry of a system or device (e.g., the system 700). In analog applications, the differential output can be coupled to additional analog filtering or amplification circuitry.

The transducer system 500 additionally includes the MEMS transducer 510 (e.g., a piezoelectric microelectromechanical system (MEMS) acoustic transducer) having the first node 516 and the second node 517. The first node 516 and the second node 517 can, in some aspects, be bond pads (e.g., the bond pads 48) or any other path node, connection point, or element of the MEMS transducer 510 that provides the output electrical signal generated by the MEMS transducer 510 from an input acoustic signal (e.g., sound waves) incident upon the cantilevers (e.g., the cantilevers 30) of the MEMS transducer 510. In the transducer system 500, the first node 516 is coupled to the inverting input 531 of the differential amplifier 530.

The transducer system 500 additionally includes the attenuator 540 having the input 541 and the output 542. The input 541 of the attenuator 540 is coupled to the non-inverting output 535 of the differential amplifier 530, and the output 542 of the attenuator 540 is coupled to the second node 517 of the MEMS transducer 510.

The transducer system 500 then additionally includes the second feedback path as described above. The transducer system 500 additionally includes the MEMS transducer 511 (e.g., a piezoelectric microelectromechanical system (MEMS) acoustic transducer) having the first node 519 and the second node 518. The first node 519 and the second node 518 can, in some aspects, be bond pads (e.g., the bond pads 48) or any other path node, connection point, or element of the MEMS transducer 510 that provides the output electrical signal generated by the MEMS transducer 511 from an input acoustic signal (e.g., sound waves) incident upon the cantilevers (e.g., the cantilevers 30) of the MEMS transducer 511. In the transducer system 500, the first node 519 is coupled to the non-inverting input 532 of the differential amplifier 530.

The transducer system 500 additionally includes the attenuator 545 having the input 546 and the output 547. The input 546 of the attenuator 540 is coupled to the non-inverting output 536 of the differential amplifier 530, and the output 547 of the attenuator 545 is coupled to the second node 518 of the MEMS transducer 511. As described above, in implementations where the MEMS transducers 510, 511 are separate MEMS transducers as described above, the MEMS transducer 511 can be considered a second piezoelectric MEMS acoustic transducer configured to generate an inverted electrical signal matching the electrical signal from the MEMS transducer 510, with both electrical signals (e.g., the signal of MEMS transducer 510 and the opposite polarity or inverted signal from the second MEMS transducer 511) from a same acoustic signal configured to provide a differential signal at the differential amplifier 530.

In implementations where a single MEMS transducer or beams of a single configuration illustrated in FIGS. 1-3 is used for the MEMS transducers 510, 511, the MEMS transducer 510 can comprises a first MEMS beam (e.g., cantilever) coupled across the first node 516 and the second node 517 to generate the electrical signal (e.g., a first polarity signal). The node 519 (e.g., a third node) and the node 518 (e.g., a fourth node) can then be configured with a second MEMS beam coupled across the third node 519 and the fourth node 518 as the MEMS transducer 511. In some such aspects as described above, the third node 519 is coupled to the non-inverting input 532 of the differential amplifier 530, and the fourth node 518 is coupled to the output 547 of the attenuator 545 (e.g., a second attenuator). The second MEMS beam is configured to generate an inverted electrical signal in response to the acoustic signal such that the electrical signal and the inverted electrical signal are input to the differential amplifier 530 as a differential signal across the inverting input 531 and the non-inverting input 532 of the differential amplifier Just as described above, additional implementations can operate without attenuators 540 and 545 where a unity attenuation is part of the design. In some aspects, attenuators 540 and 545 are implemented as a single differential signal attenuator with similar inputs and outputs, but as a single device for attenuating differential signals and not treating the differential output rails as common-mode paths. In other aspects, attenuators 540, 545, or one of the attenuators 540, 545 can be programmable by control circuitry to set system trim levels to desired or targeted values to compensate for part-to-part variations and device sensitivity associated with manufacturing variations.

Figure 5C:
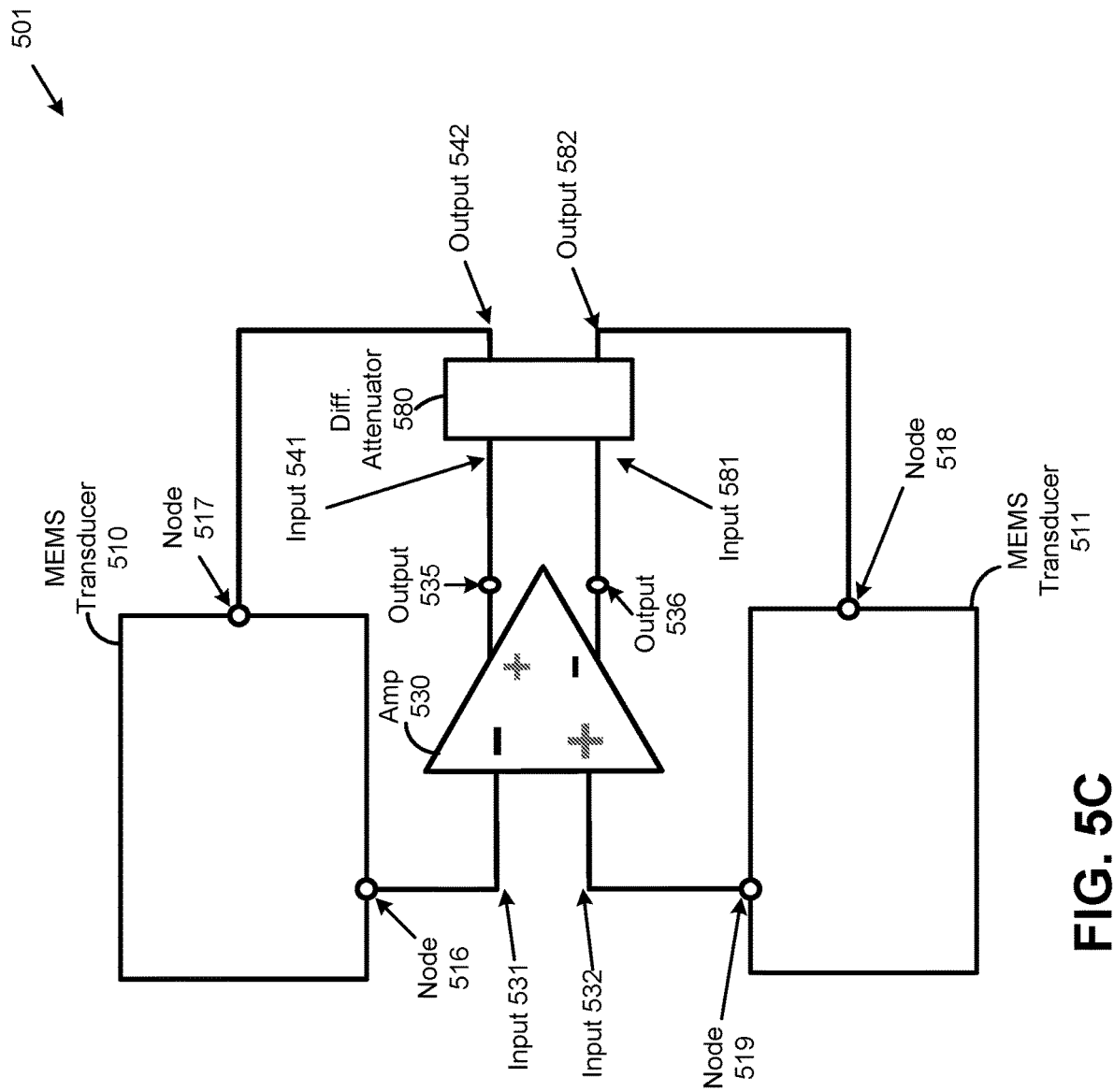
FIG. 5C illustrates aspects of a MEMS transducer system in accordance with aspects described herein.

FIG. 5C illustrates aspects of a MEMS transducer system 501 in accordance with aspects described herein. The MEMS transducer system 500 is similar to the MEMS transducer system 500, but with the attenuator and the output of the amplifier implemented as a single differential attenuator. As illustrated, the differential amplifier 530 has the inputs 531,532 and the outputs 535, 536. Rather than separate attenuators, however, a single differential attenuator 580 is present, with input 541 and output 542, along with second input 581 and second output 582. The differential signal across input 541 and input 581 is subject to modification across the differential attenuator 580 to the differential output across the output 542 and the second output 582, such that equations 1-3 above apply to the differential system 501, with Vi (differential) being the voltage across inputs 531, 532, Vo (differential) being the voltage across outputs 535, 536, and n being the attenuation across the differential signals at the inputs 541, 581 and the outputs 542,582 of the differential attenuator 580. The MEMS transducer(s) 510, 511 can operate just as described above, implemented either as a single transducer with different MEMS beams or cantilevers providing the feedback transduction signals (e.g., a first signal across nodes 516, 517 and a second signal across nodes 518, 519), or two separate MEMS transducers implemented as the MEMS transducer 510 and the MEMS transducer 511, respectively to provide the differential feedback transduction signals.

Figure 6:
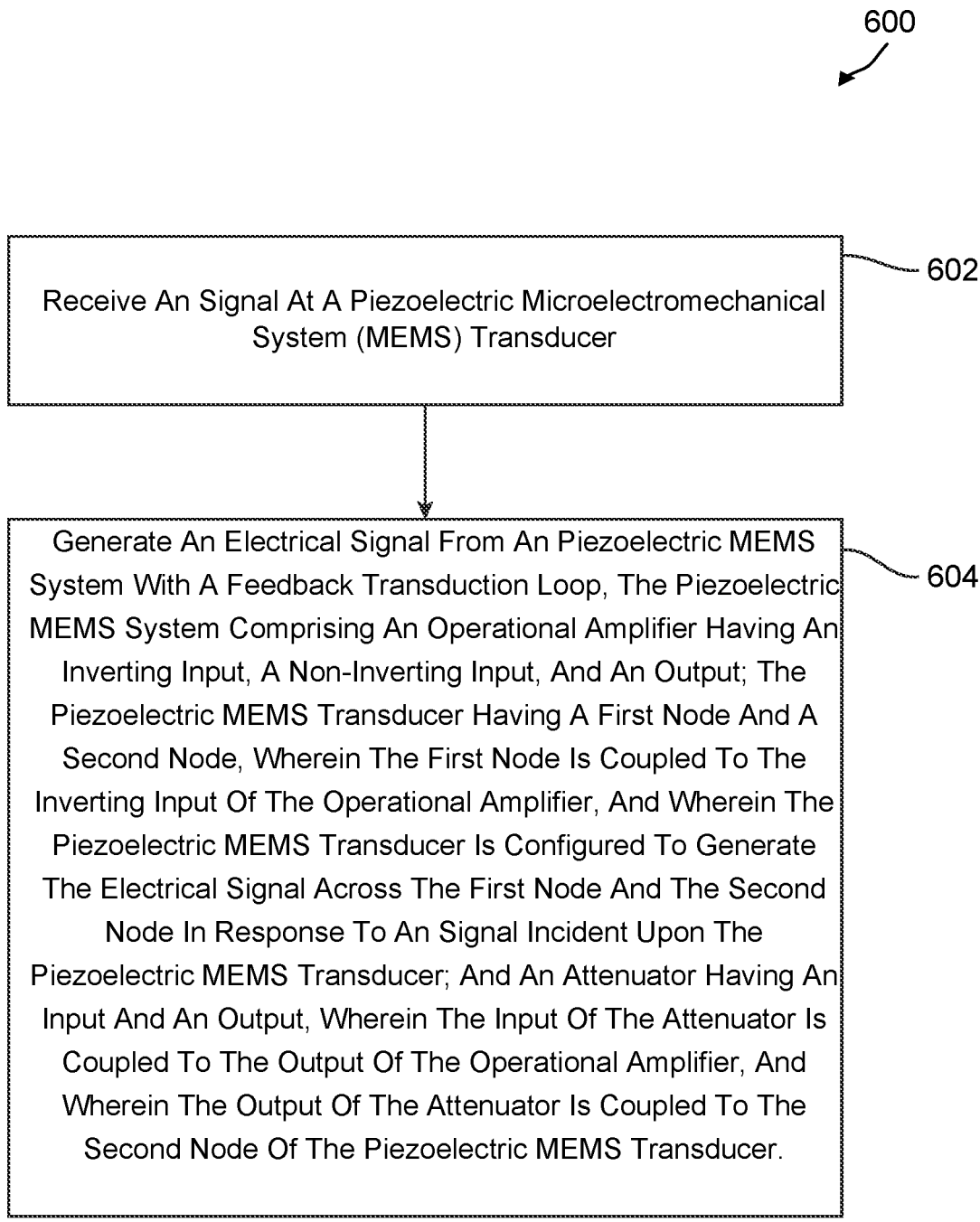
FIG. 6 illustrates a method associated with MEMS acoustic transducers in accordance with aspects described herein.

FIG. 6 illustrates a method associated with MEMS acoustic transducers in accordance with aspects described herein. FIG. 6 illustrates an example method 600 for operation of a transducer system (e.g., a system in accordance with any aspect described above. In some aspects, the method 600 is implemented by a transducer system, such as a system integrated with a device within a computing system or device (e.g., a computing system 700) as described below. In some aspects, the method 600 is implemented as computer readable instructions in a storage medium that, when executed by processing circuitry of a device, cause the device to perform the operations of the method 600 described in the blocks below. The method 600 illustrates one example aspect in accordance with the details provided herein. It will be apparent that other methods, including methods with intervening or repeated operations, are possible in accordance with the aspects described herein.

The method 600 includes block 602, which describes receiving a signal at a piezoelectric microelectromechanical system (MEMS) transducer.

The method 600 includes block 604, which describes generating an electrical signal from an piezoelectric MEMS system with a feedback transduction loop. Such blocks can be implemented by any piezoelectric MEMS system described herein. In one aspect the piezoelectric MEMS system performing operations of blocks 602 and 604 comprises an operational amplifier having an inverting input, a non-inverting input, and an output; the piezoelectric MEMS transducer having a first node and a second node, wherein the first node is coupled to the inverting input of the operational amplifier, and wherein the piezoelectric MEMS transducer is configured to generate the electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the second node of the piezoelectric MEMS transducer.

Figure 7:
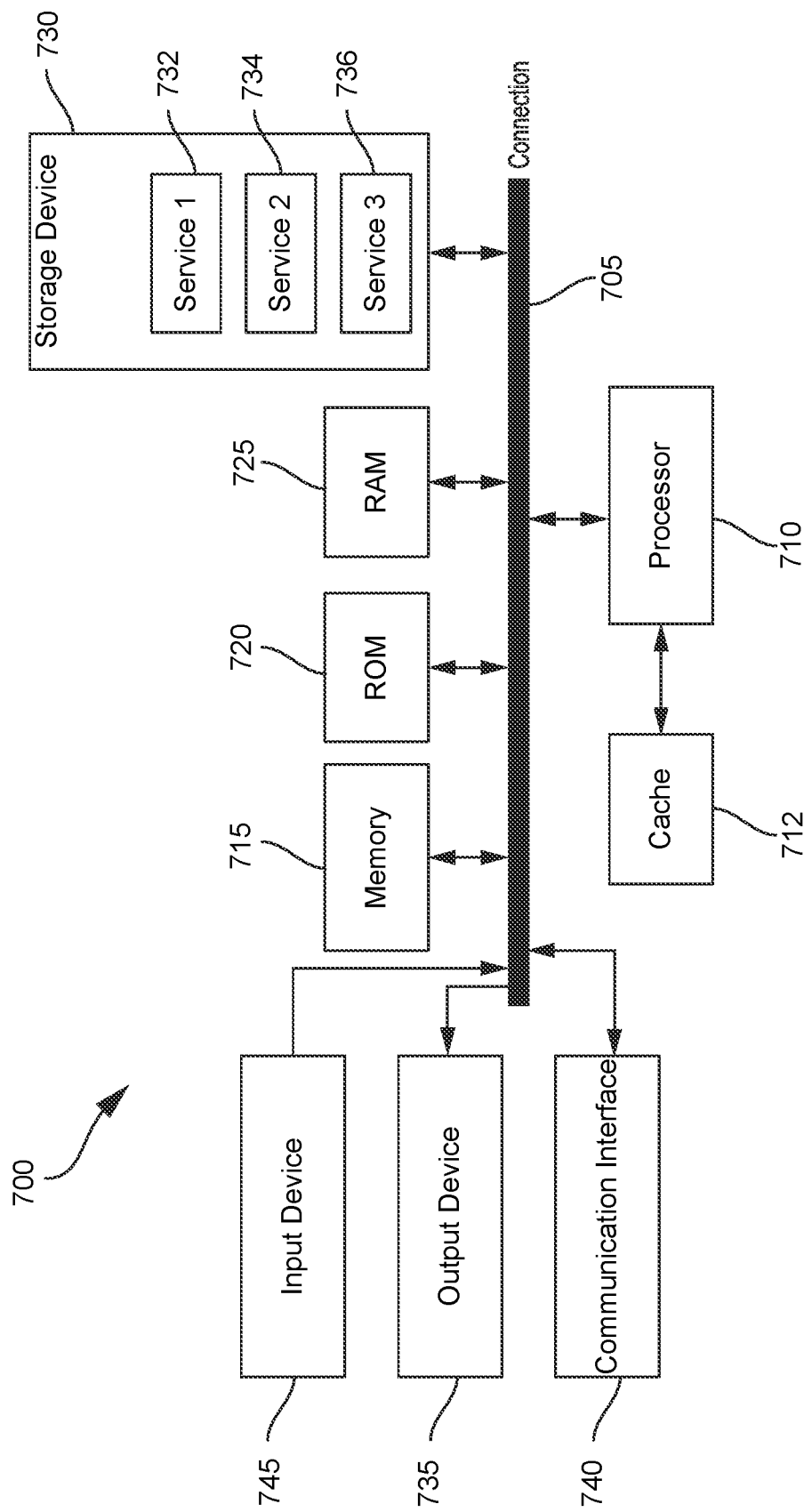
FIG. 7 illustrates a computing device integrated with a MEMS acoustic transducer in accordance with aspects described herein.

FIG. 7 is a diagram illustrating an example of a system for implementing certain aspects of the present technology. In particular, FIG. 7 illustrates an example of computing system 700 which can include a MEMS transducer system (e.g., a MEMS transducer system including a piezoelectric MEMS acoustic transducer in a feedback transduction configuration as described above) in accordance with aspects described herein. The acoustic transducer (e.g., the piezoelectric MEMS acoustic transducer and an associated MEMS transducer system) can be integrated, for example, with any computing device making up internal computing system, a remote computing system, a camera, or any component thereof in which the components of the system are in communication with each other using connection 705. Connection 705 may be a physical connection using a bus, or a direct connection into processor 710, such as in a chipset architecture. Connection 705 may also be a virtual connection, networked connection, or logical connection.

Example system 700 includes at least one processing unit (CPU or processor) 710 and connection 705 that communicatively couples various system components including system memory 715, such as read-only memory (ROM) 720 and random access memory (RAM) 725 to processor 710. Computing system 700 may include a cache 712 of highspeed memory connected directly with, in close proximity to, or integrated as part of processor 710.

Processor 710 may include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech or audio detection (e.g., piezoelectric MEMS transducer or a MEMS transducer system in accordance with aspects described above, etc.) along with other input devices 745 such as a touch-sensitive screen for gesture or graphical input, keyboard, mouse, motion input, speech, etc. Computing system 700 may also include output device 735, which may be one or more of a number of output mechanisms. In some instances, multimodal systems may enable a user to provide multiple types of input/output to communicate with computing system 700.

Computing system 700 may include communications interface 740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 may include software services, servers, services, etc., that when the code that defines such software is executed by the processor 710, it causes the system to perform a function. In some embodiments, a hardware service that performs a particular function may include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

A number of implementations have been described. Nevertheless, it will be understood that various modifications may be made without departing from the spirit and scope of the disclosure. Other embodiments are within the scope of the claims.

Illustrative aspects of the disclosure include:

Aspect 1. A transducer system comprising: an operational amplifier having an inverting input, a non-inverting input, and an output; a piezoelectric microelectromechanical system (MEMS) transducer having a first node and a second node, wherein the first node is coupled to the inverting input of the operational amplifier, and wherein the piezoelectric MEMS transducer is configured to generate an electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the second node of the piezoelectric MEMS transducer.

Aspect 2. The transducer system of Aspect 1, wherein the attenuator is a resistor divider network.

Aspect 3. The transducer system of any of Aspects 1 to 2, wherein the attenuator comprises a programmable switched resistor ladder coupled to control circuitry, the control circuitry configured to select an attenuation value for the attenuator.

Aspect 4. The transducer system of any of Aspects 1 to 2, wherein: the attenuator comprises a capacitor divider network; and the non-inverting input of the operational amplifier is coupled to a reference voltage node.

Aspect 5. The transducer system of any of Aspects 1 to 4, wherein the attenuator has an attenuation value of −10 decibels (dB).

Aspect 6. The transducer system of any of Aspects 1 to 4, wherein the attenuator has an attenuation value less than or equal to 1.

Aspect 7. The transducer system of any of Aspects 1 to 6, wherein the attenuation value is greater than or equal to $1/100$.

Aspect 8. The transducer system of any of Aspects 1 to 7, further comprising an analog-to-digital converter coupled to the output of the operational amplifier.

Aspect 9. The transducer system of any of Aspects 1 to 7, wherein the operational amplifier further comprises an inverting output separate from the output, and wherein the output is a non-inverting output.

Aspect 10. The transducer system of any of Aspects 1 to 9, further comprising: a second attenuator having an input and an output, wherein the input is coupled to the inverting output of the operational amplifier; and a second piezoelectric MEMS transducer having a first node and a second node, wherein the first node is coupled to the non-inverting input of the operational amplifier, wherein the second node is coupled to the output of the second attenuator, and wherein the second piezoelectric MEMS transducer is configured to generate an inverted electrical signal to provide a differential signal at the operational amplifier.

Aspect 11. The transducer system of any of Aspects 1 to 9, further comprising a second attenuator having an input and an output, wherein the input is coupled to the inverting output of the operational amplifier; wherein the piezoelectric MEMS transducer further comprises: a first MEMS beam coupled across the first node and the second node to generate the electrical signal; a third node coupled to the non-inverting input of the operational amplifier; a fourth node coupled to the output of the second attenuator; and a second MEMS beam coupled across the third node and the fourth node, wherein the second MEMS beam is configured to generate an inverted electrical signal in response to the signal such that the electrical signal and the inverted electrical signal are input to the operational amplifier as a differential signal across the inverting input and the non-inverting input.

Aspect 12. The transducer system of any of Aspects 1 to 9, wherein the attenuator comprises a differential attenuator, the differential attenuator having a second input and a second output, wherein the second input is coupled to the inverting output of the operational amplifier; and wherein the transducer system further comprises a second piezoelectric MEMS transducer having a first node and a second node, wherein the first node is coupled to the non-inverting input of the operational amplifier, wherein the second node is coupled to the second output of the differential attenuator, and wherein the second piezoelectric MEMS transducer is configured to generate an inverted electrical signal to provide a differential signal at the operational amplifier.

Aspect 13. The transducer system of any of Aspects 1 to 9, wherein: the attenuator comprises a differential attenuator having a second input and a second output, wherein the second input is coupled to the inverting output of the operational amplifier; wherein the piezoelectric MEMS transducer further comprises: a first MEMS beam coupled across the first node and the second node to generate the electrical signal; a third node coupled to the non-inverting input of the operational amplifier; a fourth node coupled to the second output of the differential attenuator; and a second MEMS beam coupled across the third node and the fourth node, wherein the second MEMS beam is configured to generate an inverted electrical signal in response to the signal such that the electrical signal and the inverted electrical signal are input to the operational amplifier as a differential signal across the inverting input and the non-inverting input.

Aspect 14. A microelectromechanical system (MEMS) transducer system comprising: an operational amplifier having an inverting input, a non-inverting input, and an output; and a piezoelectric MEMS transducer coupled between the inverting input and the output of the operational amplifier.

Aspect 15. The MEMS transducer system of Aspect 14 further comprising an attenuator coupled between the output of the operational amplifier and the piezoelectric MEMS transducer.

Aspect 16. The MEMS transducer system of any of Aspects 14 to 15, wherein the operational amplifier is a differential amplifier, wherein the attenuator is a differential attenuator further coupled between the non-inverting input and a second output of the operational amplifier.

Aspect 17. The MEMS transducer system of any of Aspects 14 to 16, wherein the piezoelectric MEMS transducer comprises a MEMS microphone.

Aspect 18. The MEMS transducer system of any of Aspects 14 to 17, wherein the piezoelectric MEMS transducer system has an inherent input referred noise that is independent of a gain of a closed-loop system from the output to the inverting input.

Aspect 19. A method comprising: receiving a signal at a piezoelectric microelectromechanical system (MEMS) transducer; generating an electrical signal from an piezoelectric MEMS system with a feedback transduction loop, the piezoelectric MEMS system comprising: an operational amplifier having an inverting input, a non-inverting input, and an output; the piezoelectric MEMS transducer having a first node and a second node, wherein the first node is coupled to the inverting input of the operational amplifier, and wherein the piezoelectric MEMS transducer is configured to generate the electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the second node of the piezoelectric MEMS transducer.

Aspect 20. The method of Aspect 19, wherein the signal is an acoustic signal, and wherein the acoustic signal is received via an acoustic port of the piezoelectric MEMS transducer.

Aspect 21. A microelectromechanical (MEMS) transducer, comprising means for providing an output signal in accordance with any aspect above.

Aspect 22. A method for operating any MEMS transducer described herein.

Aspect 23. A storage medium comprising instructions that, when executed by a system, causes the system to perform any operations described herein.

What is claimed is:

1. A transducer system comprising:
an operational amplifier having an inverting input, a non-inverting input, and an output;
a piezoelectric microelectromechanical system (MEMS) transducer having a first node and a second node, wherein the first node is coupled to the inverting input of the operational amplifier, wherein the second node is directly connected to an output of the transducer system, and wherein the piezoelectric MEMS transducer is configured to generate an electrical signal across the first node and the second node in response to a signal incident upon the piezoelectric MEMS transducer; and
an attenuator having an input and an output, wherein the input of the attenuator is coupled to the output of the operational amplifier, and
wherein the output of the attenuator is coupled to the output of the transducer system formed by the second node of the piezoelectric MEMS transducer.

2. The transducer system of claim 1, wherein the attenuator is a resistor divider network.

3. The transducer system of claim 1, wherein the attenuator comprises a programmable switched resistor ladder coupled to control circuitry, the control circuitry configured to select an attenuation value for the attenuator.

4. The transducer system of claim 1, wherein:
the attenuator comprises a capacitor divider network; and
the non-inverting input of the operational amplifier is coupled to a reference voltage node.

5. The transducer system of claim 1, wherein the attenuator has an attenuation value of −10 decibels (dB).

6. The transducer system of claim 1, wherein the attenuator has an attenuation value less than or equal to 1.

7. The transducer system of claim 6, wherein the attenuation value is greater than or equal to $1/100$.

8. The transducer system of claim 1, further comprising an analog-to-digital converter coupled to the output of the operational amplifier.

9. The transducer system of claim 1, wherein the operational amplifier further comprises an inverting output separate from the output of the operational amplifier, and wherein the output of the operational amplifier is a non-inverting output.

10. The transducer system of claim 9, further comprising:
a second attenuator having an input and an output, wherein the input of the second attenuator is coupled to the inverting output of the operational amplifier; and
a second piezoelectric MEMS transducer having a first node and a second node, wherein the first node is coupled to the non-inverting input of the operational amplifier, wherein the second node is coupled to the output of the second attenuator, and wherein the second piezoelectric MEMS transducer is configured to generate an inverted electrical signal to provide a differential signal at the operational amplifier.

11. The transducer system of claim 9, further comprising a second attenuator having an input and an output, wherein the input of the second attenuator is coupled to the inverting output of the operational amplifier;
wherein the piezoelectric MEMS transducer further comprises:
a first MEMS beam coupled across the first node and the second node to generate the electrical signal;
a third node coupled to the non-inverting input of the operational amplifier;
a fourth node coupled to the output of the second attenuator; and a second MEMS beam coupled across the third node and the fourth node, wherein the second MEMS beam is configured to generate an inverted electrical signal in response to the electrical signal such that the electrical signal and the inverted electrical signal are input to the operational amplifier as a differential signal across the inverting input and the non-inverting input.

12. The transducer system of claim 9, wherein the attenuator comprises a differential attenuator, the differential attenuator having a second input and a second output, wherein the second input of the differential attenuator is coupled to the inverting output of the operational amplifier; and wherein the transducer system further comprises a second piezoelectric MEMS transducer having a first node and a second node, wherein the first node is coupled to the non-inverting input of the operational amplifier, wherein the second node is coupled to the second output of the differential attenuator, and wherein the second piezoelectric MEMS transducer is configured to generate an inverted electrical signal to provide a differential signal at the operational amplifier.

13. The transducer system of claim 9, wherein:

the attenuator comprises a differential attenuator having a second input and a second output, wherein the second input of the differential attenuator is coupled to the inverting output of the operational amplifier;

wherein the piezoelectric MEMS transducer further comprises:

a first MEMS beam coupled across the first node and the second node to generate the electrical signal;

a third node coupled to the non-inverting input of the operational amplifier;

a fourth node coupled to the second output of the differential attenuator; and a second MEMS beam coupled across the third node and the fourth node, wherein the second MEMS beam is configured to generate an inverted electrical signal in response to the electrical signal such that the electrical signal and the inverted electrical signal are input to the operational amplifier as a differential signal across the inverting input and the non-inverting input.

14. A microelectromechanical system (MEMS) transducer system comprising:

an operational amplifier having an inverting input, a non-inverting input, and an output;

a piezoelectric MEMS transducer directly coupled between the inverting input and an output of the MEMS transducer system; and an attenuator coupled having an input coupled to the output of the operational amplifier and an output coupled to the output of the MEMS transducer system.

15. The MEMS transducer system of claim 14, wherein the operational amplifier is a differential amplifier, wherein the attenuator is a differential attenuator further coupled between the non-inverting input and a second output of the operational amplifier.

16. The MEMS transducer system of claim 14, wherein the piezoelectric MEMS transducer comprises a MEMS microphone.

17. The MEMS transducer system of claim 14, wherein the MEMS transducer system has an inherent input referred noise that is independent of a gain of a closed-loop system from the output to the inverting input.

18. A method comprising:

receiving a signal at a piezoelectric microelectromechanical system (MEMS) transducer;

generating an electrical signal from a piezoelectric MEMS system with a feedback transduction loop, the piezoelectric MEMS system comprising:

an operational amplifier having an inverting input, a non-inverting input, and an output;

the piezoelectric MEMS transducer having a first node and a second node, wherein the first node is coupled to the inverting input of the operational amplifier, wherein the second node is directly coupled to an output of the transducer system, and wherein the piezoelectric MEMS transducer is configured to generate the electrical signal across the first node and the second node in response to a signal incident upon the piezoelectric MEMS transducer; and an attenuator having an input and an output, wherein the input of the attenuator is coupled to the output of the operational amplifier, and wherein the output of the attenuator is coupled to the output of the transducer system formed by the second node of the piezoelectric MEMS transducer.

19. The method of claim 18, wherein the signal is an acoustic signal, and wherein the acoustic signal is received via an acoustic port of the piezoelectric MEMS transducer.

* * * * *